(12) United States Patent
Bauer

(10) Patent No.: US 7,111,951 B2
(45) Date of Patent: Sep. 26, 2006

(54) ENVIRONMENTALLY IMPROVED REARVIEW MIRROR ASSEMBLY

(75) Inventor: Frederick T. Bauer, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 11/124,987

(22) Filed: May 9, 2005

(65) Prior Publication Data

US 2005/0200936 A1    Sep. 15, 2005

Related U.S. Application Data

(63) Continuation of application No. 10/263,308, filed on Oct. 2, 2002, now Pat. No. 6,899,437.

(51) Int. Cl.
*G02B 5/08* (2006.01)

(52) U.S. Cl. .................................................. 359/883

(58) Field of Classification Search ............... 359/838, 359/883

See application file for complete search history.

(56) References Cited

U.S. PATENT DOCUMENTS

| | | | | |
|---|---|---|---|---|
| 5,452,842 A * | 9/1995 | Melton et al. | ......... | 228/180.22 |
| 5,814,205 A * | 9/1998 | McAleer et al. | ............ | 205/789 |
| 5,971,552 A * | 10/1999 | O'Farrell et al. | ........... | 359/871 |
| 6,204,490 B1 * | 3/2001 | Soga et al. | .................. | 219/678 |
| 6,440,567 B1 * | 8/2002 | Choate et al. | .............. | 428/418 |
| 6,447,915 B1 * | 9/2002 | Komiyatani et al. | ........ | 428/416 |
| 6,469,443 B1 * | 10/2002 | Bryant et al. | ................ | 313/636 |
| 6,565,217 B1 * | 5/2003 | Laroche et al. | ............. | 359/838 |
| 6,631,023 B1 * | 10/2003 | Berneth et al. | ............. | 359/265 |

* cited by examiner

*Primary Examiner*—Euncha P. Cherry
(74) *Attorney, Agent, or Firm*—James E. Shultz, Jr.

(57) ABSTRACT

An environmentally improved rearview mirror assembly is provided which incorporates a reflective element with variable reflectance. In one embodiment, the environmentally improved rearview mirror assembly is substantially free of cadmium (Cd). In another embodiment, the environmentally improved rearview mirror assembly is substantially free of lead (Pb). In yet another embodiment, the environmentally improved rearview mirror assembly is substantially free of mercury (Hg). In a further embodiment, the environmentally improved rearview mirror assembly is substantially free of poly-vinyl-chloride (PVC). In yet a further embodiment, the environmentally improved rearview mirror assembly is substantially free of halogen producing chemicals such as bromine (Br).

21 Claims, 3 Drawing Sheets

ENVIRONMENTALLY IMPROVED REARVIEW MIRROR ASSEMBLY

CROSS REFERENCE TO RELATED APPLICATIONS

This application is a continuation of U.S. Patent application entitled Environmentally Improved Rearview Mirror Assembly, Ser. No. 10/263,308, filed Oct. 2, 2002, now U.S. Pat. No. 6,899,437, by Frederick T. Bauer.

BACKGROUND OF THE INVENTION

Rearview mirrors have long been incorporated into vehicles for providing the controlled vehicle operator with a generally rearward view of the controlled vehicle while the operator's vision is generally directed toward the front windshield of the controlled vehicle. Rearview mirrors are often times mounted inside and outside the vehicle. Typically, one rearview mirror is mounted in the upper, center, area of the front windshield inside the vehicle. A second rearview mirror is typically mounted in the lower, forward, area of the driver's side window outside the vehicle. It is common to have a third rearview mirror mounted in the lower, forward, area of the passenger side window, also outside the vehicle.

Recently, variable reflectance, reflective elements have been incorporated into both the inside and, more recently, into the outside rearview mirrors of vehicles. Variable reflectance mirrors sense ambient and, or, glare light levels and automatically vary the reflectance of the given reflective element to prevent the eyes of the operator of the controlled vehicle from being subjected to high levels of reflected light. The headlights of trailing vehicles and the sun, while near the horizon behind the controlled vehicle, are two common sources of "glare" light. One inherent benefit of variable reflectance rearview mirrors, related to nighttime driving, is that headlights of trailing vehicles are sensed by the associated automatic mirror control and the reflectance is automatically adjusted to minimize the glare imposed upon the eyes of the operator of the controlled vehicle while maximizing rear vision.

Devices of reversibly variable transmittance to electromagnetic radiation, wherein the transmittance is altered by electrochromic means, are described, for example, by Chang, "Electrochromic and Electrochemichromic Materials and Phenomena," in Non-emissive Electrooptic Displays, A. Kmetz and K. von Willisen, eds. Plenum Press, New York, N.Y. 1976, pp. 155–196 (1976) and in various parts of Eletrochromism, P. M. S. Monk, R. J. Mortimer, D. R. Rosseinsky, VCH Publishers, Inc., New York, N.Y. (1995). Numerous electrochromic devices are known in the art. See, e.g., Manos, U.S. Pat. No. 3,451,741; Bredfeldt et al., U.S. Pat. No. 4,090,358; Clecak et al., U.S. Pat. No. 4,139,276; Kissa et al., U.S. Pat. No. 3,453,038; Rogers, U.S. Pat. Nos. 3,652,149, 3,774,988 and 3,873,185; and Jones et al., U.S. Pat. Nos. 3,282,157, 3,282,158, 3,282,160 and 3,283,656.

In addition to these devices there are commercially available electrochromic devices and associated circuitry, such as disclosed in U.S. Pat. No. 4,902,108, entitled "Single-Compartment, Self-Erasing, Solution-Phase Electrochromic Devices Solutions for Use Therein, and Uses Thereof", issued Feb. 20, 1990 to H. J. Byker; Canadian Patent No. 1,300,945, entitled "Automatic Rearview Mirror System for Automotive Vehicles", issued May 19, 1992 to J. H. Bechtel et al.; U.S. Pat. No. 5,128,799, entitled "Variable Reflectance Motor Vehicle Mirror", issued Jul. 7, 1992 to H. J. Byker; U.S. Pat. No. 5,202,787, entitled "Electro-Optic Device", issued Apr. 13, 1993 to H. J. Byker et al.; U.S. Pat. No. 5,204,778, entitled "Control System For Automatic Rearview Mirrors", issued Apr. 20, 1993 to J. H. Bechtel; U.S. Pat. No. 5,451,822, entitled "Electronic Control System", issued Sep. 19, 1995 to J. H. Bechtel et al. and U.S. Pat. No. 6,402,328, entitled "Automatic Dimming Mirror using Semiconductor Light Sensor with Integral Charge Collection," issued Jul. 11, 2002 to Bechtel et al. Each of these patents is commonly assigned with the present invention and the disclosures of each, including the references contained therein, are hereby incorporated herein in their entirety by reference. Such electrochromic devices may be utilized in a fully integrated inside/outside rearview mirror system or as separate inside or outside rearview mirror systems.

With the increased numbers of variable reflectance mirrors being used, there is a correspondingly increased desire to provide an environmentally improved variable reflectance mirror design. Millions of mirrors are being produced annually that incorporate variable reflectance elements with the above mentioned components.

Known variable reflectance mirrors incorporate photo cells for sensing the ambient and glare light. Most commonly used photo cells comprise a cadmium-based material as the active medium for sensing optical radiation. The output of the photo cell is incorporated into an associated automatic mirror control. It is common for variable reflectance mirrors to incorporate one photo cell for sensing ambient light and a second cell for sensing glare light. Cadmium Sulfide (CdS) and Cadmium Telluride (CdTe) are two commonly used materials in photo cells.

Additionally, it has been common practice to treat various components within mirrors with Cadmium to prevent corrosion. Particularly, with regard to mirrors installed outside the vehicle, corrosion prevention is preferred.

Typical control circuitry for use with a variable reflectance mirror element incorporates lead-based solder for interconnection of the various electrical components including connection of the photo cells. It is common to use a printed circuit board for mounting the individual electrical components.

Bromine (Br) is commonly added to printed circuit boards in the form of tetrabromo-bisphenol A (TBBPA) as a flame-retardant. When involved in a fire, TBBPA produces toxic and corrosive gases such as halide gases and halogen. Brominated epoxy resin exhibits high flame retardancy. However, it generates noxious hydrogen bromide, polybromine dibenzofurans, and polybromine dibenzodoxins when burned. Moreover, antimony trioxide ($Sb_2O_3$), a synergist commonly used in combination with brominated epoxy resin has recently been labeled as a suspected carcinogen.

It is also common for the reflective elements in a mirror, variably reflective or not, to incorporate a lead-based paint on at least one surface of the associated substrates. Use of a protective coat of lead-based paint enhances the long-term reflective clarity and the durability of reflective elements. Typically, silver (Ag), or a silver alloy, is used as a reflective coating on a piece of glass to derive the reflective characteristic of a mirror. Without the lead-based paint coating over the silver, oxidation will cause degradation of the silver coating.

It is common for inside rearview mirrors to comprise switches and push buttons for human interaction. The switches and push buttons provide a host of control features such as map lights, telematic functions, compass readings, temperature readings, etc. Mercury (Hg) containing switches are commonly used in electrical circuitry.

Typically, the reflective element and associated control circuitry, circuit boards and pushbutton switches are incorporated into a mirror housing with a bezel defining an opening for viewing the reflective element. It is common for the housing and bezel to be molded from a poly-vinyl-chloride (PVC) material.

Cadmium (Cd) is a known cancer-causing agent. Lead (Pb) is known to produce undesirable effects in humans. Bromine (Br) containing printed circuit boards are known to produce halide gasses, such as halogen, during the manufacture of related electrical circuits and in the event of circuit board fires. Mercury (Hg) has been well identified as an environmentally damaging material. Poly-vinyl-chloride is also known to be harmful to the environment when discarded.

Many automotive manufactures, suppliers and consumers have become more environmentally conscious and responsible. Additionally, there are more environmental regulations that require products to be environmentally improved. Therefore, there remains a need in the art of vehicle rearview mirrors for a variable reflectance mirror assembly that is environmentally improved.

SUMMARY OF THE INVENTION

A rearview mirror assembly with automatically variable reflectivity is provided that incorporates a cadmium (Cd) free photo cell for sensing the ambient and, or, glare light. Relatively new types of light sensors incorporate a silicon-based light transducer and associated conditioning electronics on a single substrate. The ability to incorporate additional electronics on the same substrate as the light transducer increases component integration. Component integration additionally reduces the system components that comprise environmentally harmful materials. Types of charge accumulating light transducers for use with the present invention include photodiodes and photogate transistors. A variety of charge integrating photodiode devices have been described including those in U.S. Pat. No. 4,916,307 to Nishibe et al.; U.S. Pat. No. 5,214,274 to Yang; U.S. Pat. No. 5,243,215 to Enomoto et al.; U.S. Pat. No. 5,338,691 to Enomoto et al.; and U.S. Pat. No. 5,789,737 to Street. Photogate transistor devices are described in U.S. Pat. No. 5,386,128 to Fossum et al.; U.S. Pat. No. 5,471,515 to Fossum et al. and U.S. Pat. No. 6,359,274, to Nixon et al. Each of these patents is herein incorporated in its entirety by reference.

A mirror assembly substantially free of Cadmium is provided by replacing Cadmium-treated metallic components with metallic components treated with zink, phosphate, black oxide, or the like, in addition to employing Cadmium free photo cells.

In another embodiment of the present invention, a reflective element substantially free of lead-base paint is provided. Many known rearview mirrors incorporate a lead-based paint as a protective coating for, otherwise, exposed surfaces. U.S. Pat. No. 5,818,625, to Forgette et al., describes an electrochromic rearview mirror incorporating a third surface metal reflector for use with the present invention. The lead-based paint protective coat of the prior art mirror is deleted in the reflector of the '625 patent. The disclosure of the '625 patent is incorporated herein by reference thereto.

In another embodiment of the present invention, an electrical control circuit is provided that is substantially free of lead-based solder. Lead-free solder joining for electrical component interconnection and for attaching electrical components to printed circuit boards has been gaining in popularity. Until recently, the glass transition temperature (Tg) of known lead-free solder was too high for reliably joining electrical components that are heat sensitive. The associated soldering processes caused damage to the associated electrical components. Silicon-based light sensors used in various embodiments of variably reflective mirrors in accordance with the present invention are particularly susceptible to damage when exposed to high temperatures. Recently, more acceptable lead-free solders and associated soldering processes have been developed for use with the present invention. Tin (Sn), zinc (Zn), silver (Ag) and copper (Cu) alloys are known substitutes for lead (Pb) and lead alloys.

In another embodiment of the present invention, a rearview mirror assembly is provided substantially free of bromine (Br) and halide gas producing materials. Printed circuit boards are now available that comprise non-halogen producing and non-phosphorus flame retardant materials. One such printed circuit board material for use with the present invention is described in U.S. Pat. No. 6,337,363, to Lee et al. The disclosure of the '363 patent is incorporated herein in its entirety by reference.

In another embodiment of the present invention, a rearview mirror assembly is provided that is substantially free of poly-vinyl-chloride (PVC). Many alternatives to poly-vinyl-chloride (PVC) containing materials have been developed for molding mirror housings and bezels. In one embodiment of the present invention, a housing and bezel are provided free of PVC. Acrylonitrile-Butadiene-Styrene-Poly-Carbenate (ABSPC) and Acrylonitrile-Styrene-Acrylate (ASA) are two known replacements for PVC. Magnesium alloy is another material for use with rearview mirror assemblies in accordance with this embodiment of the present invention. Other PVC free materials may be used in accordance with this embodiment of the present invention.

The features and advantages of the present invention will become readily apparent from the following detailed description of the best mode for carrying out the invention when taken in connection with the accompanying figures and appended claims.

DETAILED DESCRIPTION OF THE PREFERRED EMBODIMENTS

The environmentally improved rearview mirror assemblies in accordance with the present invention anticipate the need to discard the assembly once the vehicle that incorporates the assembly reaches the end of its useful life. Rearview mirror assemblies in accordance with various embodiments of the present invention incorporate components that are environmentally friendly.

Figure 1:
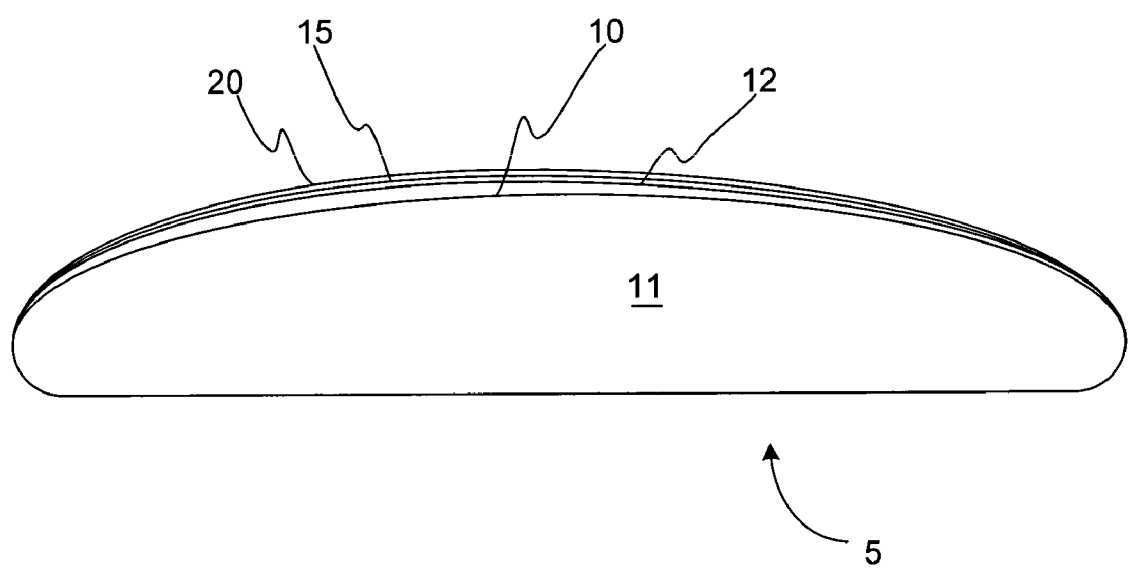
FIG. 1 depicts a reflective element of a non-variable reflectance mirror.

Turning to FIG. 1, a reflective element 5 is shown to include a piece of glass 11 with a first surface 10 and a second surface 12. It is common for such reflective elements to incorporate a reflective coating 15, such as silver (Ag), on the second surface of the glass 11. As is well known, silver exposed to air becomes oxidized over time and turns a yellowish-brown; oxidation is particularly problematic in warm, humid, environments. This oxidation negatively affects the reflectivity and clarity of the associated mirror.

In an effort to overcome the oxidation problem, it has become common to coat the silver or silver alloy coating with a layer of lead-based paint 20. The coating of lead-based paint 20 seals the silver from the surrounding air, thereby, impeding oxidation of the silver.

It is commonly accepted that lead (Pb) in lead-based paint is harmful to the environment when the associated mirror assembly is discarded. The negative effects of lead (Pb) when ingested by humans are well known. Many alternatives to lead-based paints have been developed and are preferred for use with the present invention. One embodiment of the present invention, as described herein, obviates the need for an oxidation inhibiting material entirely.

Figure 2:
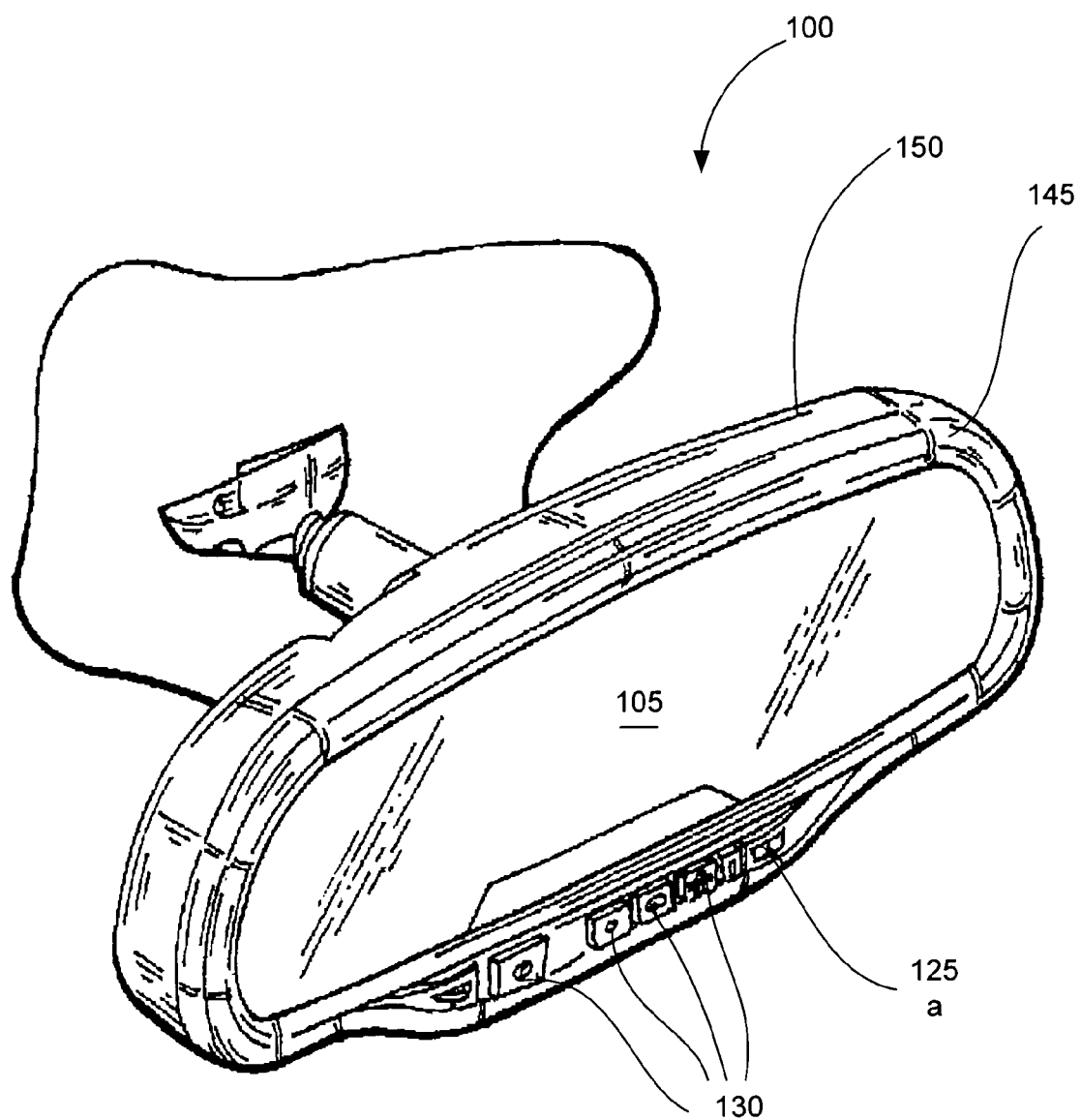
FIG. 2 depicts a perspective view of a mirror incorporating a variable reflectance element in accordance with the present invention.
Figure 3:
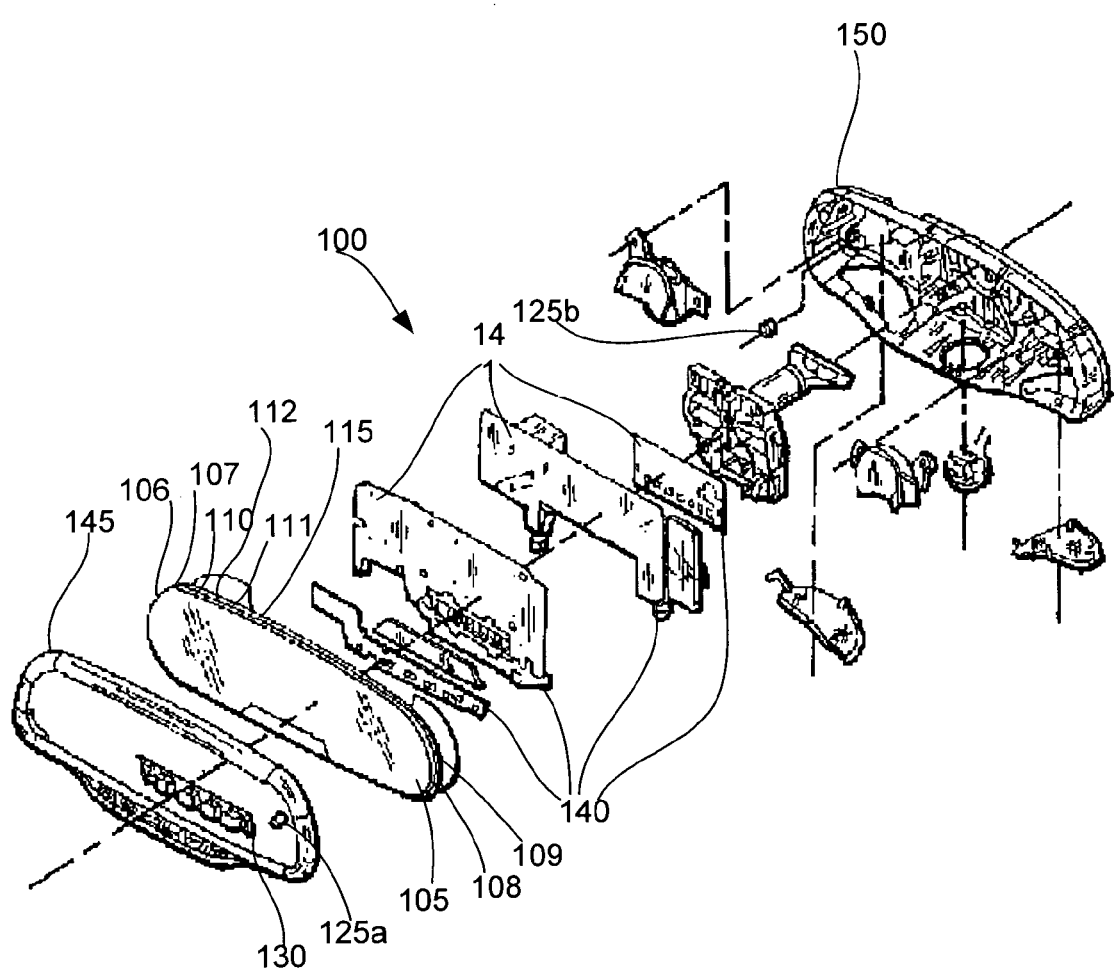
FIG. 3 depicts an exploded view of the mirror of FIG. 2.

Turning now to FIGS. 2 and 3, a rearview mirror assembly 100 is shown to include a variable reflectance element 105. Although only an inside rearview mirror is shown, the embodiments of the present invention described herein are equally applicable to outside rearview mirrors. Variable reflectance elements 105 have recently been gaining in popularity for vehicle applications. One such variable reflectance element for use within the present invention is described in U.S. Pat. No. 5,818,625, to Forgette et al., which is of common assignment with the present application. The disclosure of the '625 patent is incorporated in its entirety herein by reference. As described in the '625 patent, the lead-based paint is deleted. As shown in FIG. 3, and as described in detail in the disclosure of the '625 patent, the preferred variable reflectance element 105 incorporates a first piece of glass 110 and a second piece of glass 111. The first piece of glass 110 comprises a first surface 106 and a second surface 107. The second piece of glass 111 incorporates a third surface 108 and a fourth surface 109. It has become common in the art of variable reflectance mirror elements to refer to the four surfaces as labeled herein.

As described in the '625 patent, a reflective layer 115, such as silver (Ag), chromium (Cr), rhodium (Rh), ruthenium (Ru), etc. or a metallic alloy, is applied to the third surface 108. A variably transmissive medium 112, along with the reflective layer 115 is sandwiched between the second surface 107 and the third surface 108. A seal (not shown) is in place between the second and third surfaces, near the perimeter of the pieces of glass 110, 111 such that the reflective layer 115 and variably transmissive medium 112 are isolated from the surrounding air. Preferably, the variably transmissive medium 112 is an electrochromic medium as described in the '625 patent.

By placing the reflective layer 115 on the third surface 108 and sealing off the surrounding air, the lead-based paint coating is no longer needed to prevent oxidation of the reflective layer. Thus, the rearview mirror assembly in accordance with one embodiment of the present invention is substantially free of lead-based paint. It is also in accordance with the present invention to use a non-variable reflectance element free of lead base paint. U.S. Pat. No. 6,147,803, to Laroche et al., that is incorporated in its entirety herein by reference, discloses a substitute for lead-based paint. This lead-free paint system can be used on variably-reflective and non-variably-reflective mirror assemblies in accordance with various embodiments of the present invention.

It has become common for variable reflectance elements 105 to be combined with associated electrical circuits 140 to provide automatically variable reflectance rearview mirrors. It has also become common to incorporate a glare sensor 125a for sensing light rays that are directed toward the associated variable reflectance element 105. Additionally, it has become common to incorporate an ambient sensor 125b for sensing the ambient light rays surrounding the associated mirror assembly. Cadmium (Cd) containing photo cells have been commonly used for light sensors in known variable reflectance rearview mirror assemblies.

Most recently, cadmium containing photo cells are being replaced with silicon based lights sensors. U.S. Pat. No. 6,359,274, to Nixon et al., which is incorporated in its entirety herein by reference, discloses a rearview mirror assembly incorporating an silicon-based light sensor. Silicon is environmentally preferred with respect to cadmium. Additionally, use of a silicon-based sensor facilitates integration of additional electrical components, such as transistors and operational amplifiers, onto a common silicon substrate. Integration of electrical components further improves the environmental aspects of various embodiments of the present invention.

Other types of charge accumulating light transducers that may be used with various embodiments of the present invention include photodiodes and photogates. A variety of charge integrating photodiode devices exist, including those in U.S. Pat. No. 4,916,307 to Nishibe et al.; U.S. Pat. No. 5,214,274 to Yang; U.S. Pat. No. 5,243,215 to Enomoto et al.; U.S. Pat. No. 5,338,691 to Enomoto et al.; and U.S. Pat. No. 5,789,737 to Street. Photogate transistor devices are described in U.S. Pat. No. 5,386,128 to Fossum et al. and U.S. Pat. No. 5,471,515 to Fossum et al. Each of these patents is herein incorporated in its entirety by reference.

Cadmium causes other problems in rearview mirror assemblies, in that it has been common to provide metallic components and fasteners that incorporate a cadmium treatment for corrosion prevention. Cadmium treatment is commonly used on the windshield attachment shoe for the mirror assembly mount, the mirror assembly mount, fasteners to connect the mount to the mirror assembly housing, fasteners used to mount components within the housing, and screws used to attach various mirror assembly components to one another, as well as, miscellaneous connectors within the rearview mirror assemblies. In an effort to improve the environmental properties of the rearview mirror assembly, other materials may be used. In at least one embodiment of the present invention, the rearview mirror assembly may employ metallic components and fasteners treated with zink, phosphate, black oxide or similar corrosion prevention materials in lieu of cadmium treated metallic components and fasteners.

Thereby, the preferred rearview mirror assembly in accordance with one embodiment of the present invention is substantially free of cadmium (Cd). It is within the scope of the present invention to use any cadmium free photo cells and cadmium free corrosion treatment.

It is common for electrical circuits within variable reflectance rearview mirrors to incorporate lead-based solder for interconnecting the associated individual components, as well as, for connecting the ambient and glare sensors. In a preferred embodiment of the present invention, a non-lead-based solder is used for interconnection of the electrical components. Solder connections include resistors, transistors, integrated circuit chips, printed circuit boards, electrical connectors, wire bonds, capacitors, inductors, electrical sockets, illuminators, pushbuttons, etc. generally shown as reference 140 in FIG. 3. As mentioned above, recent developments in soldering processes, as well as, in the related materials has made it possible to interconnect electrical components with lead-free solder. Additionally, the components listed above have become available free of lead coating on the associated connectors and conductors.

Lead-free solder joining for electrical component interconnection and for attaching electrical components to printed circuit boards has been gaining in popularity. Until recently, the glass transition temperature (Tg) of known lead-free solder was too high for reliably joining electrical components that are heat sensitive. The associated lead-free solder soldering processes caused damage to the associated electrical components. Recently, more acceptable lead-free solders and associated soldering processes have been developed for use with the present invention. Tin (Sn), zinc (Zn), silver (Ag) and copper (Cu) alloys are being substituted for lead (Pb) and lead alloys and are in accordance with the present invention. U.S. Pat. No. 6,241,145, to Maeda et al., which is incorporated herein by reference thereto, discloses a lead-free solder joining method for use with the present invention. Thereby, the preferred rearview mirror assembly in accordance with one embodiment of the present invention is substantially free of lead-based solder.

By utilizing a variable reflectance element, or a non-variable reflectance element, similar to those described above, substantially free of lead-based paint in combination with a lead-free solder in the associated rearview mirror assembly, a rearview mirror assembly in accordance with one embodiment of the present invention is substantially free of lead (Pb).

It has become generally common for electrical circuits to incorporated printed circuit boards for mounting and interconnecting individual electrical components, this is equally true with regard to electrical circuits of rearview mirror assemblies. The preferred electrical circuits 140 in accordance with the present invention incorporate printed circuit boards 141 free of bromine (Br) and other halogen producing materials. Bromine (Br) is commonly added to printed circuit boards in the form of tetrabromo-bisphenol A (TBBPA) as an effective flame-retardant. If involved in a fire, TBBPA produces toxic and corrosive gases such as halogen. Brominated epoxy resin exhibits high flame retardancy. However, it generates noxious hydrogen bromide, polybromine dibenzofurans, and polybromine diebenzodoxins when burned. Moreover, antimony trioxide ($Sb_2O_3$), a synergist commonly used in company with brominated epoxy resin has recently been labeled as a suspected carcinogen.

U.S. Pat. No. 6,337,363, to Lee et al., which is incorporated herein by reference thereto describes an epoxy resin composition with non-halogen, non-phosphorus flame retardant for manufacturing printed circuit boards 141. It is preferred to use a printed circuit board 141 incorporating an epoxy similar to that described in the '363 patent. Thereby, a rearview mirror assembly 100 in accordance with one embodiment of the present invention is substantially free of bromine (Br) and other halogen producing materials.

It is common for inside rearview mirrors to comprise switches and push buttons for human interaction. The switches and push buttons provide a host of control features such as map lights, telematic functions, compass readings, temperature readings, etc. Mercury (Hg) containing switches are commonly used in electrical circuitry. Mercury (Hg) has been used as a medium in electrical devices to provide long lasting, highly conductive, switching. Switches and pushbuttons have been developed that have contacts incorporating materials such as gold (Au) to provide a long life, highly conductive, device. Thus, mercury (Hg) is no longer required to obtain a satisfactory device.

It is preferred to use pushbutton switches 130 in the rearview mirror assembly in accordance with one embodiment of the present invention free of mercury (Hg). Thereby, the preferred review mirror assembly 100 in accordance with the present invention is substantially free of mercury (Hg).

As shown in FIG. 3, the individual components of the rearview mirror assembly are contained within a housing 150 and associated bezel 145. In a most preferred embodiment of the rearview mirror assembly 100 in accordance with the present invention, the bezel 145 and housing 150 are manufactured from a plastic material other than a polyvinyl-chloride (PVC) material. Many such materials are known such as Acrylonitrile-Butadiene-Styrene-Poly-Carbenate (ABSPC) and Acrylonitrile-Styrene-Acrylate (ASA). Thereby, the preferred rearview mirror assembly 100 in accordance with the one embodiment of the present invention is substantially free of PVC material.

The invention claimed is:

1. An environmentally improved rearview mirror assembly, comprising:
    a variable reflective element, said reflective element comprising;
    at least one glass substrate with a coating containing silver on at least one surface; wherein the rearview mirror assembly is substantially free of lead-based paint.

2. An environmentally improved rearview mirror assembly as in claim 1, wherein said reflective element has variable reflectance.

3. An environmentally improved rearview mirror assembly as in claim 1, wherein said reflective element is eletrochromic.

4. An environmentally improved rearview mirror assembly as in claim 1, further comprising an electrical control circuit substantially free of lead-based solder.

5. An environmentally improved rearview mirror assembly as in claim 1, further comprising an electrical control circuit substantially free of bromine.

6. An environmentally improved rearview mirror assembly as in claim 1, further comprising an electrical control circuit substantially free of mercury.

7. An environmentally improved rearview mirror assembly as in claim 1, further comprising a housing and bezel substantially free of poly-vinyl-chloride.

8. An environmentally improved rearview mirror assembly, comprising:
    a variable reflectance reflective element; and
    an electrical control circuit, wherein the rearview mirror assembly is substantially free of lead-based solder.

9. An environmentally improved rearview mirror assembly as in claim 8, wherein said lead-based solder is selected from the group comprising tin-zinc alloy, tin-silver alloy, and tin-silver-copper alloy.

10. An environmentally improved rearview mirror assembly as in claim 8, further comprising an electrical control circuit substantially free of bromine.

11. An environmentally improved rearview mirror assembly as in claim 8, further comprising an electrical control circuit substantially free of mercury.

12. An environmentally improved rearview mirror assembly as in claim 8, further comprising a housing and bezel substantially free of poly-vinyl-chloride.

13. An environmentally improved rearview mirror assembly, comprising:
    a variable reflectance reflective element;
    an electrical control circuit; and a printed circuit board, wherein the rearview mirror assembly is substantially free of bromine.

14. An environmentally improved rearview mirror assembly as in claim 13, comprising a printed circuit board made of epoxy resin having a nitrogen-compound-based flame retardant.

15. An environmentally improved rearview mirror assembly as in claim 13, comprising a printed circuit board made of epoxy resin having a phosphorus-compound-based flame retardant.

16. An environmentally improved rearview mirror assembly as in claim 13, further comprising an electrical control circuit substantially free of mercury.

17. An environmentally improved rearview mirror assembly as in claim 13, further comprising a housing and bezel substantially free of poly-vinyl-chloride.

18. An environmentally improved rearview mirror assembly, comprising:

a variable reflective element;

a housing; and a bezel, wherein the rearview mirror assembly is substantially free of poly-vinyl-chloride.

19. An environmentally improved rearview mirror assembly as in claim 18, wherein at least one of the housing or bezel comprises Acrylonitrile-Butadiene-Styrene-Poly-Carbenate (ABSPC).

20. An environmentally improved rearview mirror assembly as in claim 18, wherein at least one of the housing or bezel comprises Acrylonitrile-Styrene-Acrylate (ASA).

21. An environmentally improved rearview mirror assembly as in claim 18, wherein at least one of the housing or bezel comprises magnesium alloy.

* * * * *